United States Patent [19]

Alpini et al.

[11] 4,236,407
[45] Dec. 2, 1980

[54] PROCESS AND APPARATUS FOR THE QUALITY CONTROL INSPECTION OF VEHICLE DRIVING AXLES

[75] Inventors: Alessandro Alpini; Giacomo Ruspa, both of Turin, Italy

[73] Assignee: Centro Ricerche Fiat S.p.A., Orbassano, Italy

[21] Appl. No.: 77,063

[22] Filed: Sep. 19, 1979

[30] Foreign Application Priority Data

Oct. 19, 1978 [IT]  Italy ................................ 69400 A/78

[51] Int. Cl.³ .......................................... G01M 13/02
[52] U.S. Cl. ........................................ 73/118; 73/162;
73/579
[58] Field of Search ................. 73/118, 162, 511, 579,
73/660

[56] References Cited

U.S. PATENT DOCUMENTS 3,712,130   1/1973   Weichbrodt et al. .................. 73/162

Primary Examiner—James J. Gill
Attorney, Agent, or Firm—Sughrue, Rothwell, Mion, Zinn & Macpeak

[57] ABSTRACT

Quality control inspection of a vehicle driving axle comprising a differential unit and two half-shafts, is effected by measuring the acceleration transmitted from the axle to a support structure as the axle is driven against a resisting torque. The transmitted acceleration is measured in terms of its three-mutually-orthogonal components using accelerometers which output electrical signals to a processing unit. The unit processes these signals to derive comparison parameters which are then compared with reference values, to identify certain faults which may be present in components of the differential unit.

13 Claims, 6 Drawing Figures

PROCESS AND APPARATUS FOR THE QUALITY CONTROL INSPECTION OF VEHICLE DRIVING AXLES

The present invention relates to a process and apparatus for the quality control inspection of a vehicle driving axle of the type comprising a differential unit with a driving gear and a cooperating driven gear which are mounted in respective bearings and are arranged to transmit drive to a differential gear of the unit, and two drive half-shafts driven from said differential gear.

Quality control inspection of such driving axles is conventionally effected at the end of an assembly line by acoustically monitoring the noise produced by the driving axle during operation.

This monitoring, which depends on the sensitivity of the operator, has proved of insufficient reliability. Furthermore it does not provide an adequate indication of the nature of any defect and therefore does not enable a defective component of the axle to be accurately identified.

It is an object of the present invention to provide an inspection process which makes it possible to automatically detect, localize and identify any anomalies in the operation of the components of vehicle driving axles of the type referred to.

This is achieved in accordance with the invention in that the inspection process comprises the steps of:

mechanically coupling the driving axle to be inspected to a support structure, rotating the said driving gear of the differential unit, applying a resisting torque to the ends of the drive-shafts remote from the differential unit, obtaining, at different values of angular velocities for each direction of rotation of the said driving gear, electrical signals indicative of the acceleration transmitted from the axle to the support structure in terms of the components of this acceleration taken along three mutually orthogonal directions (X,Y,Z), processing the said electrical signals so as to obtain a series of comparison parameters, comparing the values of the said parameters obtained with corresponding predetermined reference values, and deriving from the said comparison an indication of any functional anomalies of the said driving and driven gears of the differential unit and/or of their respective bearings.

The anomalies detectable by the inspection process include localized defects in the teeth of the driving and driven gears which cause cyclic discontinuous transmission of drive and "jolts", eccentricity of mounting of the driving and driven gears which causes a cyclic variation in the surface of contact between the teeth of the gears, irregular engagement between the teeth of the driving and driven gears, and operational defects of the bearings supporting the two gears.

The invention furthermore provides inspection apparatus comprising a support structure having a pair of stays for rigidly supporting the driving axle close to its ends and a pair of connecting rods each articulated at one end to the support structure and connectable at its other end by an articulated joint to the said axle to be inspected in a zone between the said differential gear and each stay, a drive for rotating the driving gear of the differential unit, braking means for applying a resisting torque to the free ends of the drive-shafts of the axle, accelerometers mounted on one of the said connecting rods and arranged to output electrical signals indicative of the acceleration imparted to the connecting rod from the axle in terms of the components of this accelerations in three orthogonal directions (X,Y,Z), one of which (Y) is directed along the longitudinal axis of the said connecting rod, an angular velocity sensor arranged to provide an electrical output signal indicative of the rotational speed of the driving gear, and an electronic processor unit connected to receive the output signals of the said accelerometers and of the said angular velocity sensor, the said electronic means being operative to derive a series of comparison parameters from said accelerometer output signals and to compare the values of these parameters with corresponding predetermined reference values whereby to obtain from the said comparison an indication of any functional anomalies of the said driving and driven gears and bearings.

Such inspection apparatus makes it possible to effect in a quick, straightforward manner, directly at the end of an assembly line, the inspection of a driving axle mounted on the said support structure. The apparatus does not require presetting or calibration of the accelerometers, since they form an integral part of the support structure itself. This makes it possible on the one hand to simplify the setting up of the apparatus prior to inspection testing, and on the other hand to achieve a higher level of reliability of the output connections from the accelerometers.

An inspection process according to the invention and inspection apparatus embodying the invention, both for inspecting vehicle driving axles, will now be particularly described, by way of example, with reference to the accompanying diagrammatic drawings, in which.

Figure 1:
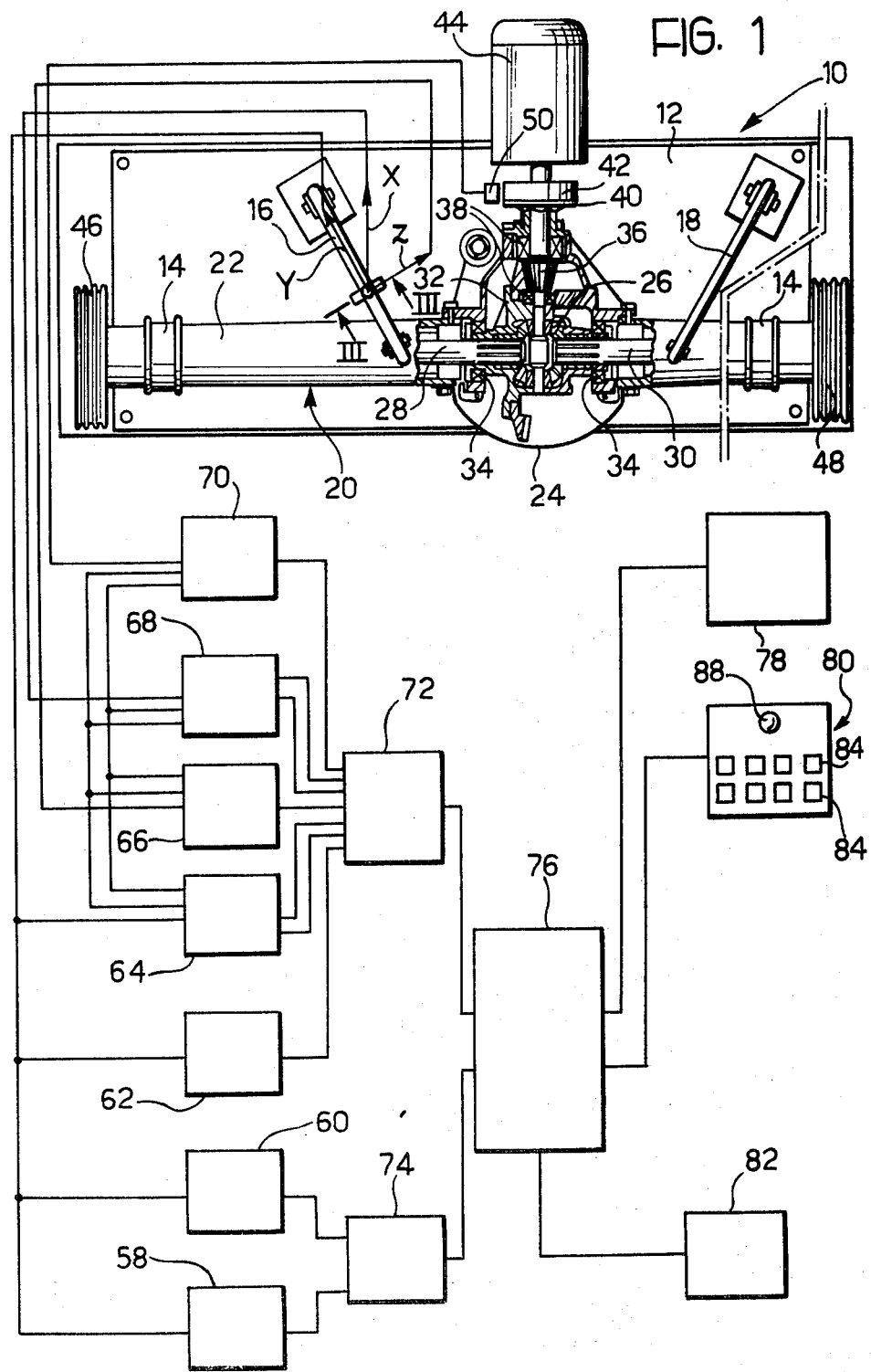
FIG. 1 is a schematic view of the inspection apparatus showing both a driving axle under test in part-cutaway view and an electronic processor unit of the apparatus in block diagram form.

As shown in the drawings, the inspection apparatus comprises a support structure 10 in the form of a stand. A plate 12 is removably mounted on top of the structure 10 and is provided with a pair of vertical stays 14. Two diagonal connecting rods 16, 18, are pivotally connected to the plate 12 adjacent one edge thereof.

The stays 14 serve to rigidly support a driving axle 20 of a motor vehicle. In the example illustrated, the axle 20 is an axle of rigid form and comprises an elongate tubular casing 22 provided centrally with an enlargement which forms a housing 24. Inside the housing 24 there is housed a differential unit, of a type known per se, which is arranged to drive a pair of drive half-shafts 28, 30 rotatably mounted co-axially within the tubular casing 22.

The differential unit includes a differential gear 26 in the form of cage-mounted differential pinions meshing with bevel wheels provided on the drive shafts 28 and 30. The differential gear 26 is driven in rotation by a pair of bevel gears comprising a driven crown wheel 32 coaxial with the drive-shafts 28, 30 and rotatably mounted in the casing 22 by a pair of rolling bearings 34, and a driving bevel pinion 36 meshing with the crown wheel 32 and rotatably mounted in the casing 22 by rolling bearings 38.

The bevel pinion 36 is coupled co-axially with a connection flange 40, arranged outside the housing 24.

The driving axle is mounted on the structure 10 (FIGS. 1 and 2) with the vertical stays 14 rigidly secured to the end portions of the casing 22 to correspond to the mounting of the axle 20 on the chassis of a motor vehicle. The free ends of the connecting rods 16, 18 are connected to the casing 22 by respective articulated joints located between the housing 24 and respective one of the stays 14.

The flange 40 coupled to the bevel pinion 36 is connected to a flange 42 supported on the end of the shaft of an electric motor 44. In the example illustrated, the motor 44 is a motor of the direct current type.

The free ends of the drive-shafts 28, 30 are coupled to respective brakes 46, 48, arranged to set up a resisting torque to rotation of the axle 20 during inspection testing of the axle. In the example illustrated, the brakes 46, 48 are brakes of the electrical induction type.

The inspection apparatus further includes an angular velocity sensor 50 which, for example, comprises a magnetic pick-up secured to the structure 10 and operatively associated with the flange 42 of the electric motor 44.

Figure 3:
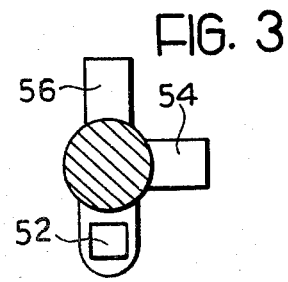
FIG. 3 is an enlarged sectional view on line III—III of FIG. 1.

A set of three accelerometers 52, 54 and 56 (shown in detail in FIG. 3) are secured approximately midway along the connecting rod 16. The accelerometers 52, 54 and 56 comprise transducers of the piezo-electric type acting along respective ones of three mutually-orthogonal reference axes X, Y and Z. In particular, the axis Y extends parallel to the longitudinal axis of the connecting rod 16. The accelerometer transducers 52, 54 and 56 are arranged to output electrical signals indicative of the components (referred to the axes X, Y and Z) of the acceleration transmitted during inspection testing from the axle 20 to the connecting rod 16. Since the transducers 52, 54 and 56 are integral with the support structure 10, it is not necessary to effect any setting-up or calibration operations before inspection of the axle 20 can commence after the axle has been secured on the support structure 10. This makes it possible to simplify the inspection process and to reduce the time involved (the inspection process will be described in more detail hereinafter). It may be noted in addition that, although in the example shown the axle 20 is of the rigid type, the apparatus can be adapted for the inspection of driving axles of a type different from that shown simply by replacement of the plate 12 with a plate adapted to the forms and dimensions of the type of axles it is desired to inspect.

The inspection apparatus further comprises an electronic processor unit arranged to receive and process the outputs of the accelerometers 52, 54, 56 and of the velocity sensor 50 in order to obtain a series of parameter values for comparison with predetermined reference values. The results of these comparisons provide an indication of any operational anomalies of the pair of bevel gears 32, 36 and/or of the corresponding support bearings 34, 38.

Figure 2:
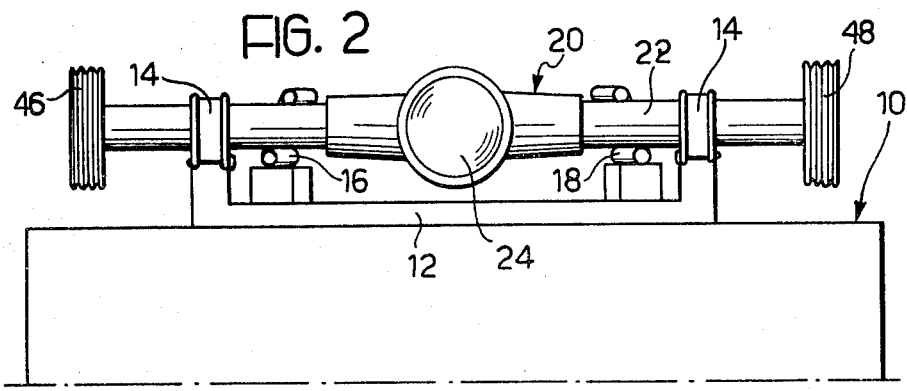
FIG. 2 is a front elevation showing the driving axle under test mounted on a support struction.

As is illustrated in FIG. 1, the electronic processor unit comprises a first analogue circuit 58, a second analogue circuit 60, and a bank of filters 62. The inputs of the circuits 58 and 60 and of the filters 62 are all connected with the output of the accelerometer 52. The processor unit further comprises three coherent demodulator circuits 64, 66 and 68 the inputs of which are connected respectively with the outputs of the accelerometers 52, 54, 56, and a circuit 70 the input of which is connected with the output of the angular velocity sensor 50.

The outputs of the analogue circuits 58, 60 are connected to the input of a digital interface circuit 74, whilst the outputs of the bank of filters 62, of the coherent demodulators 64, 66 and 68 and of the circuit 70 are connected to a circuit 72 which includes an analogue-digital converter.

The outputs of the digital interface circuit 74 and of the circuit 72 are connected to a processor 76. The processor 76 can, for example, comprise a ULP 32 microprocessor manufactured and marketed by the firm S.E.P.A. of Turin.

The processor 76 is connected to a control panel 78, to a control panel 80 and to a teleprinter 82.

The control panel 80 is provided with two rows of four indicator lights 84, 86 and with an indicator light 88.

Figure 4:
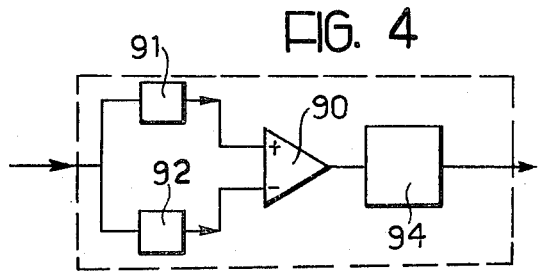
FIGS. 4, 5 and 6 are block diagrams of selected portions of the electronic processor unit of the apparatus.

As is shown in detail in FIG. 4, the first analogue circuit 58 comprises a comparator 90 provided with two inputs connected respectively, via a level change circuit 91 and via an RMS circuit 92 with the output of the accelerometer 52. The squaring circuit 92 outputs a signal corresponding to the mean square value of the signal fed to its input from the accelerometer 52. The output of the comparator 90 is connected to the input of a counter circuit 94 arranged to count the number of times the mean square value of the accelerometer output signal is exceeded by the instantaneous value of a predetermined percentage of that signal (this predetermined percentage being set by the level-change circuit 91 and being, for example, 70%). The counter circuit 94 is further arranged to output a signal to the digital interface circuit 74 when its count value is equal to or greater than a predetermined value which, for example, may be set at ten.

Figure 5:
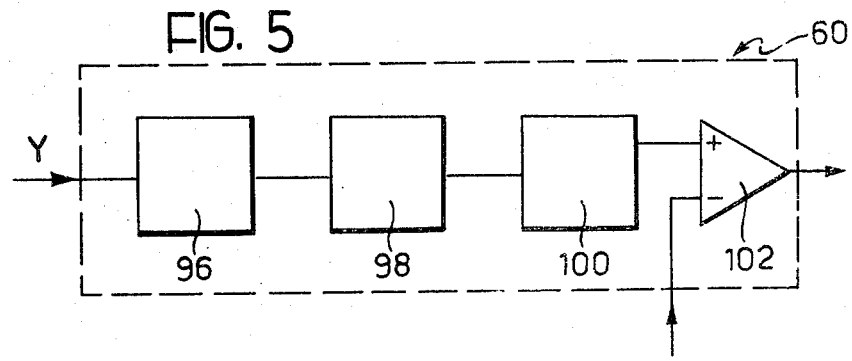

The second analogue circuit 60 (FIG. 5) comprises a band-pass filter 96 directly connected to the output of the accelerometer 52 and tuned to the teeth-engagement or meshing frequency of the bevel gears 32 and 36, this frequency corresponding to the value of the number of revolutions per minute of the pinion 36 multiplied by the number of the teeth of the pinion 36 and divided by sixty. The output of the filter 96 is connected to the input of an envelope demodulator 98 the output of which is connected to an RMS circuit 100. The circuit 100 is arranged to output a signal corresponding to the mean square value of the signal fed to its input. The output of the circuit 100 is connected to one input of a comparator circuit 102 a second input of which is supplied with an electrical signal corresponding to a predetermined threshold value from the control panel 78 of the processor 76.

The bank of filters 62 comprises six band-pass filters the centre frequencies of which are at ⅓ of an octave spacing, viz at frequencies of 3.15, 4, 5, 6.3, 8, 10 KHz. The inputs of all the filters are connected to the output of the accelerometer 52, while the output of each filter is connected via a respective RMS circuit, to the analogue-digital converter of the circuit 72.

The circuit 70 connected to the output of the angular velocity sensor 50, comprises a frequency-voltage converter (not shown) of known form whose output is connected to the circuit 72. The circuit 70 further comprises a frequency synthesizer (also of known form and not shown) arranged to synthesize two sinusoidal signals in phase quadrature with each other and with a frequency equal to the meshing frequency. The output signals from the frequency synthesizer are thus $\sin \omega_i t$ and $\cos \omega_i t$ respectively, where $\omega_i$ is the teeth-meshing frequency of the bevel gears 32, 36.

Figure 6:
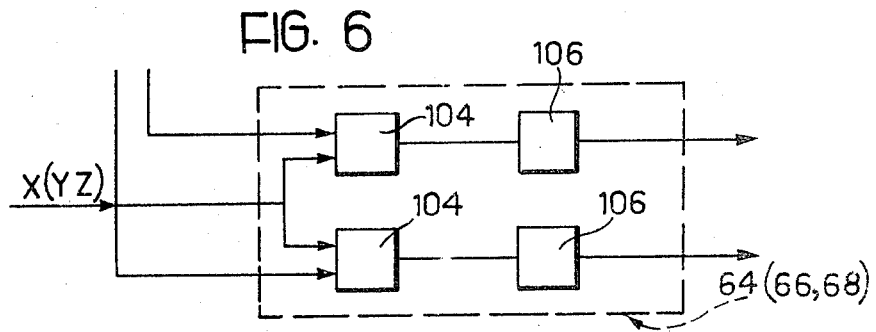

The outputs of the frequency synthesizer of the circuit 70 are connected to the three coherent demodulators 64, 66, 68. As is shown in FIG. 6, each coherent demodulator 64, 66, 68 comprises a pair of multiplier circuits 104 each with two inputs one of which is connected to a respective one of the outputs of the frequency synthesizer of the circuit 70, and the other one of which is connected to the relevant accelerometer sensor 52, 54 and 56. The output of each multiplier circuit 104 is connected to an RMS circuit 106.

The outputs of the circuits 106 are connected with the inputs of a multiplexer (not shown) of known form included in the circuit 72. The timing or clocking signals for this multiplexer are constituted by the output signal from the frequency/voltage converter of the circuit 70. The output of the multiplexer is connected to the analogue/digital converter of the circuit 72.

Operation of the inspection apparatus during quality control testing of the driving axle 20 will now be described.

Following the positioning and mounting of the axle 20 on the support structure 10, the electric motor 44 is energised to rotatably drive the pinion 36 and crown wheel 32 via the flanges 42 and 44. During a first phase of the inspection process, the sense of rotation of the shaft of the motor 44, and therefore of the pair of gears 36, 32 and of the drive-shafts 28, 30, is that corresponding to the simulation of forward running of the driving axle 20. During this phase, the electric induction brakes 46, 48 exert a resisting torque at the free ends of the drive shafts 28, 30 which simulates the resisting moment transmitted to the axle 20 from the driving wheels of a motor vehicle during operational use of the axle.

In the first phase of the inspection process, the pinion 36 is rotated during three successive time intervals, respectively at a constant angular velocity corresponding to approximately 1500 r.p.m., at a gradually increasing velocity of between approximately 1500 r.p.m. and 4500 r.p.m., and at a constant velocity corresponding to approximately 4500 r.p.m. These time intervals are of 3 seconds, 45 seconds, and 6 seconds respectively.

During the first time interval, corresponding to a constant velocity of 1500 r.p.m., only the output signal from the accelerometer 52 is used. The signal is fed both to the first analogue circuit 58 and to the second analogue circuit 60.

The input signal of the first analogue circuit 58 passes via the level change circuit 91 to one input of the comparator 90 and via the circuit 92 to the other input of the comparator 90. The comparator 90 compares the two signals fed to its inputs and generates an output signal upon the mean square value of the output signal from the accelerometer 52 being exceeded by the instantaneous value of a predetermined percentage of that signal (this percentage being set by the circuit 91). The counter 94 counts the number of output pulses generated by the comparator 90 and upon a predetermined count value being reached (for example, ten) changes the state of its output from a state corresponding to a "no" signal, to a state corresponding to a "yes" signal.

The output of the counter 94 is fed via the digital interface circuit 74 to the processor 76, on demand by this processor 76. During the first time interval of the inspection process, should the output of the counter 94 correspond to a "yes" signal, the processor 76 is arranged to indicate this visually by energising one of the indicator lights 84 of the control panel 80. Lighting up of this light 84 indicates the presence of a localized defect of a tooth of the pair of gears 32, 36, which causes a cyclic discontinuous transmission of motion between these gears giving rise to a jolting noise. Such a defect may be due, for example, to chipping caused by a knock during manufacture.

At the same time as being fed to the first analogue circuit 58, the output signal from the accelerometer 52 is also supplied to the second analogue circuit 60. This signal is passed via the filter 96 tuned to the meshing frequency, to the envelope demodulator 98. The mean square value of this signal, obtained by the circuit 100, is compared in the comparator 102 with the threshold value set from the control panel 78 of the processor 76. The output signal from the comparator 102 corresponds to a "yes" signal if the signal from the accelerometer 52 exceeds the said threshold value, and to a "no" signal if the accelerometer signal is less than this threshold value. The comparator output signal passes via the digital interface circuit 74 to the processor 76, on demand by the said processor. In the case where the signal corresponds to a "yes" signal, the processor 76 is arranged to indicate this visually by energising a corresponding one of the indicator lights 84. The lighting up of this light 84 indicates a cyclic variation of the rolling surface between the teeth of the pair of gears 32 and 36, due to the eccentric mounting of one of these gears 32, 36.

During the second time interval in which the pinion 36 is rotated at a velocity gradually increasing from 1500 r.p.m. to 4500 r.p.m., the output signals from all three accelerometers are utilized. During this interval, the meshing frequency of the pair of gears 32, 36 is "followed" by means of the three coherent demodulators 64, 66, 68. In fact, the multiplier circuits 104 of the demodulators 64, 66, 68 serve to multiply the output signals from the accelerometers 52, 54 and 56 respectively by the sinusoidal signals $\sin \omega_i t$ and $\cos \omega_i t$ generated by the synthesizer of the circuit 70. The output signals from the multipliers 104 are fed via the squaring circuits 106 to the multiplexer of the circuit 72. This multiplexer serves to supply to the analogue/digital converter of the circuit 72, at regular intervals determined by means of the signal coming from the frequency/voltage converter of the circuit 70, the pairs of synthesized and squared signals corresponding to the three accelerometers 52, 54, 56. These pairs of signals are fed to the processor 76 which adds together the values obtained for each pair, so as to obtain values corresponding to the squares of the components, according to the axis X, Y and Z, of the instantaneous acceleration transmitted from the axle to the connecting rod 16. From these values, memorized by the processor 76, there is obtained the square value of the modulus of the acceleration transmitted from the driving axle 20 to the connecting rod 16. In this manner, instantaneous acceleration values are obtained each of which corresponds to the value of the vibration caused by the pair of gears 32, 36, independently of the relative phase between the three components detected by the accelerometers 52, 54 and 56.

The square values of the acceleration modulus are used to generate a parameter for comparison in the processor 76 with a predetermined threshold limit value. This parameter may, for example, be the average of the mean values of acceleration obtained during a series of sample intervals corresponding to different values of angular velocity of the pinion 36. The number and the duration of these sample intervals may be varied (by modifying the instructions supplied to the processor 76 before the inspection process is started) in dependence on the inspection standard selected from time to time, or due to the need to adapt the inspection process to driving axles of a different type or having different ratios.

At the end of the said comparison operation, if the comparison parameter has exceeded the said threshold value, the processor 76 is arranged to indicate this visually by energising a corresponding one of the indicator lights 84. Lighting up of this light 84 indicates defective engagement between the teeth of the gears 32, 36 which causes an irregular meshing noise.

During the third time interval, in which the pinion 36 is driven in rotation at a constant velocity corresponding to approximately 4500 r.p.m., the only signal utilized is the signal fed from the accelerometer 52 to the bank of filters 62. This signal is filtered into six frequency bands the centre frequencies of which are at ⅓ of an octave spacing and correspond to the frequencies 3.15, 4, 5, 6.3, 8, 10 KHz. The mean square value of the output signal from each filter is sent, via the analogue-digital converter 72, to the processor 76 which compares these signals with predetermined threshold values. If the values of the signals corresponding to the pass bands centred at 8 and 10 KHz are greater than the corresponding predetermined values, the processor 76 is arranged to energise a corresponding one of the indicator lights 84. Lighting up of this light 84 indicates a functional defect in the support bearings 38 of the pinion 36.

If the values corresponding to the pass bands centred at 5, 6.3, 8 and 10 KHz are greater than the corresponding threshold values, the processor 76 is arranged to energise the last of the light indicator lights 84. The lighting up of this light 84 indicates a functional defect in the support bearings 34 of the crown wheel 32.

The values of the signals corresponding to the frequency bands centred at 3.15 and 4 KHz although not used in the foregoing example, may be utilised during testing of driving axles of a different type from the one illustrated.

At the end of the operations described above, the inspection cycle is repeated but with the shaft of the motor 44 (and therefore the pair of gears 32, 36 and the drive-shafts 28, 30) rotated in reverse in such a way as to simulate the conditions of reverse running of the driving axle 20. In the course of this phase of the inspection process, any defects in the functioning of the pair of gears 32, 36 and/or the support bearings 34, 38 are indicated by the processor 76 by means of the lighting of the indicator lights 86.

At the end of the inspection process, the identity of any indicator lights 84, 86 which are lit up makes it possible to determine precisely the cause (or causes) of any operational defects of the driving axle 20 and to localize immediately the defective components of this driving axle.

Alternatively, in the case where no operational defect of the axle 20 is found during the inspection process, the processor 76 is arranged to provide a visual indication of the correct functioning of this axle 20 by energising the indicator light 88 of the control panel 80.

Furthermore, the processor 76 is so arranged that upon demand it will print out by means of the teleprinter 82, the details of the data obtained during testing which relate to the defects of the bearings and to the noise of meshing engagement of the pair of gears 32, 36 as a function of the number of revolutions of the pinion 36 for each direction of rotation.

We claim:

1. A quality control inspection process for a vehicle driving axle of the type comprising a differential unit with a driving gear and a cooperating driven gear which are mounted in respective bearings and are arranged to transmit drive to a differential gear of the unit, and two drive half-shafts driven from said differential gear, the inspection process comprising the steps of:
   mechanically coupling the driving axle to be inspected to a support structure,
   rotating the said driving gear of the differential unit,
   applying a resisting torque to the ends of the driveshafts remote from the differential unit,
   obtaining at different values angular velocities for each direction of rotation of the said driving gear, electrical signals indicative of the acceleration transmitted from the axle to the support structure in terms of the components of this acceleration taken along three mutually orthogonal directions,
   processing the said electrical signals so as to obtain a series of comparison parameters,
   comparing the values of the said parameters obtained with corresponding predetermined reference values, and
   deriving from the said comparison an indication of any functional anomalies of the said driving and driven gears of the differential unit and/or of their respective bearings.

2. An inspection process according to claim 1, in which the step of mechanically coupling the driving axle to the support structure comprises the operations of rigidly securing the axle adjacent each of its distal ends, to the support structure, and connecting each rod of a pair of connecting rods between the support structure and a zone of the axle lying between one of its distal ends and the said differential gear, the two said zones of the axle being situated on opposite sides of the differential gear considered along the axle.

3. An inspection process according to claim 2, in which the step of obtaining the said electrical signals comprises the operations of:
   mounting on one of the said connection rods a set of three accelerometers arranged to output electrical signals, the orientation of the accelerometers being such that each is responsive to a respective one of the said components of acceleration transmitted from the axle to the said connecting rod with one said component being directed along the longitudinal axis of the connecting rod,
   rotating said driving gear at a constant velocity corresponding to approximately 1500 r.p.m. during a first time interval,
   utilising the output signal of the accelerometer directed along to the longitudinal axis of the connecting rod, to derive at least one said comparison parameter during said first time interval, rotating the said driving gear at a gradually increasing velocity of between approximately 1500 r.p.m. and 4500 r.p.m. during a second time interval, utilizing the output signals from the three accelerometers to derive further comparison parameters during said second time interval, rotating the said driving gear at a constant velocity corresponding to approximately 4500 r.p.m. during a third time interval, and utilising the output signals from the accelerometer sensitive to the said component directed along to the longitudinal axis (Y) of the connecting rod to derive at least one additional comparison parameter during said third time interval.

4. An inspection process according to claim 3, in which during said first time interval, the utilised accelerometer output signal under goes the following operations which together constitute said processing and comparing steps:

(A) obtaining the mean square value of the utilised signal, comparing the signal with the mean square value obtained, counting the number of times that a predetermined percentage of the instantaneous value of the signal exceeds the mean square value, comparing the said number with a predetermined numberical value, and obtaining from the said comparison an indication of the presence of any localized defects of the teeth of the said driving and driven gears, (B) filtering the utilised signal at the frequency of meshing engagement of the driving and driven gears, demodulating the filtered signal, obtaining the mean square value of the demodulated signal, comparing the said mean square value with a predetermined threshold value, and obtaining from the said comparison an indication of any eccentricity of mounting of the said driving and driven gears.

5. An inspection process according to claim 3, in which the steps of processing and comparing the accelerometer signals utilised during the said second time interval comprise the operations of:

demodulating coherently each accelerometer signal, obtaining the mean square value of the demodulated signals, taking a plurality of samples of the instantaneous mean square values of each signal at regular increments of angular velocity of the said driving gear, obtaining for each of the said samples the instantaneous square value of the modulus of the acceleration transmitted from the axle to the support structure obtaining a mean value of the said instantaneous square values of the modulus of the acceleration, comparing the said mean value with a predetermined threshold value, and obtaining from the said comparison an indication of the level of noise of meshing engagement of the said driving and driven gears.

6. An inspection process according to claim 3, in which the steps of processing and comparing the electrical signal utilised during the said third time interval comprise the operations of:

filtering the signal into a plurality of predetermined frequency bands, the centre frequencies of which are at one third of an octave spacing, obtaining the mean square values of the filtered signals, comparing the said mean square value of each filtered signal with a predetermined threshold value, and obtaining from the said comparison an indication of any defects of the bearings of the said driving and driven gears.

7. Apparatus for effecting quality control inspection of a vehicle driving axle of the type comprising a differential unit with a driving gear and a cooperating driven gear which are mounted in respective bearings and which are arranged to transmit drive to a differential gear of the unit, and two drive half-shafts driven from said differential gear, the apparatus comprising:

a support structure having a pair of stays for rigidly supporting the driving axle close to its ends and a pair of connecting rods each articulated at one end to the support structure and connectable at its other end by an articulated joint to the said axle to be inspected, in a zone between the said differential gear and each stay, a drive for rotating the driving gear of the differential unit, braking means for applying resisting torque to the free ends of the drive-shafts of the axle, accelerometers mounted on one of the said connecting rods and arranged to output electrical signals indicative of the acceleration imparted to the connecting rod from the axle in terms of the components of this accelerations in three orthogonal directions, one of which is directed along the longitudinal axis of the said connecting rod, an angular velocity sensor arranged to provide an electrical output signal indicative of the rotational speed of the driving gear, and an electronic processor unit connected to receive the output signals of the said accelerometers and of the said angular velocity sensor, the said electronic means being operative to derive a series of comparison parameters from said accelerometer output signals and to compare the values of these parameters with corresponding predetermined reference values whereby to obtain from the said comparison an indication of any functional anomalies of the said driving and driven gears and their bearings.

8. Apparatus according to claim 7, in which the accelerometers comprise a set of three transducers one of which is aligned with the longitudinal axis of the connecting rod mounting the accelerometers.

9. Apparatus according to claim 8, in which the transducers are of the piezo-electric type.

10. Apparatus according to any one of claims 7 to 9, in which the electronic processor unit comprises:

a first analogue processor circuit, a second analogue processor circuit, and a bank of filters with centre frequencies at a third of an octave spacing, the analogue circuits and the filters being connected to the output of the accelerometer responsive to the component of acceleration along the longitudinal axis of the connecting rod, a set of three coherent demodulators each connected to the output of a respective one of the accelerometers, a processor having an associated control panel and teleprinter, an analogue/digital converter circuit having a plurality of inputs connected respectively with the output of the said angular velocity sensor, with the outputs of the said coherent demodulators and with the outputs of the said bank of filters, the output of the converter circuit being connected to the processor, and a digital interface circuit the input of which is connected to the outputs of the said first and second analogue processor circuits and the output of which is connected to the said processor.

11. Apparatus according to claim 10, in which the first analogue processor circuit comprises:

a squaring circuit for obtaining the mean square value of a signal fed to the analogue processor circuit, a comparator for comparing the value of a said signal fed to the processor circuit with its mean square value, and a counter the input of which is connected to the output of the said comparator and the output of which is connected with the said digital interface circuit, the said counter being arranged to count the number of times that a predetermined percentage of the peak value of the said signal fed to the processor circuit exceeds the mean square value of this signal, and to provide an output upon this number, at least equalling a predetermined numerical value.

12. Apparatus according to claim 10, in which the second analogue processor circuit comprises:

a band-pass filter tuned to the frequency of meshing engagement of the driving and driven gears of the differential unit, an envelope demodulator for demodulating the output signal from the filter, a squaring circuit for obtaining the mean square value of the demodulator output signal, and a comparator arranged to compare the said mean square value with a predetermined threshold value and to indicate whether this mean square value is greater or less than the said predetermined threshold value.

13. Apparatus according to claim 10, in which the said control panel associated with the processor has a plurality of indicator lights for indicating functional anomalies of the said driving and driven gears and of their bearings.

* * * * *